(No Model.)

R. A. CHESEBROUGH.
ELECTRIC RAILWAY.

No. 386,184. Patented July 17, 1888.

Witnesses:
Joseph W. Roe.
C. Sundgren.

Inventor:
Robert A. Chesebrough
by attorneys
Brown & Ball.

UNITED STATES PATENT OFFICE.

ROBERT A. CHESEBROUGH, OF NEW YORK, N. Y.

ELECTRIC RAILWAY.

SPECIFICATION forming part of Letters Patent No. 386,184, dated July 17, 1888.

Application filed May 7, 1888. Serial No. 273,041. (No model.)

*To all whom it may concern:*

Be it known that I, ROBERT A. CHESEBROUGH, of the city and county of New York, in the State of New York, have invented a new and useful Improvement in Electric Railways, of which the following is a specification.

In carrying out this invention I employ, substantially as is shown in my United States Letters Patent No. 375,123, dated December 20, 1887, a stationary rack contiguous to the track and a toothed wheel carried by the car and driven by a motor on the latter.

In the specification of those Letters Patent I do not describe any kind of motor to be used. I now purpose to employ for the driving of the said toothed wheel an electric motor upon the car and to convey to the said motor the current from a stationary dynamo through a conductor of which said rack and toothed wheel form portions; and my present invention consists in certain combinations, hereinafter described and claimed, whereby the above purpose is accomplished.

Figure 1:
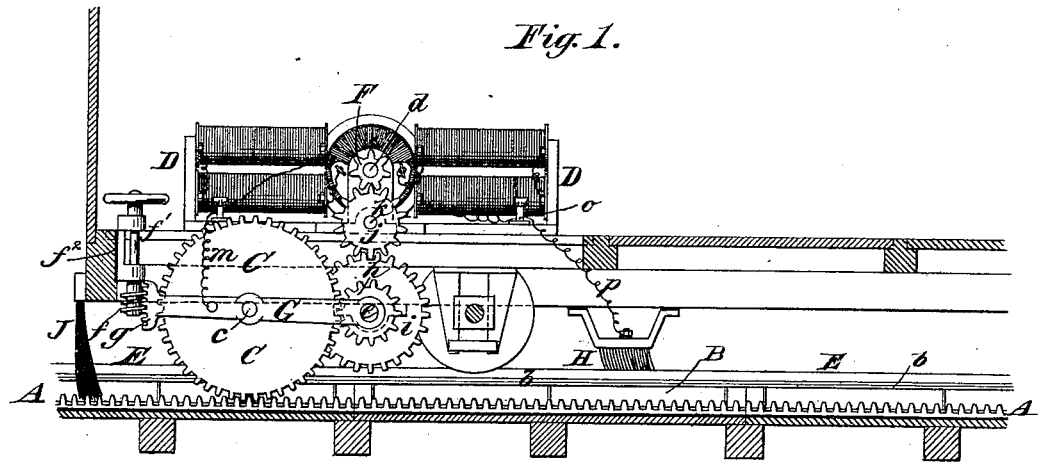
Figure 2:
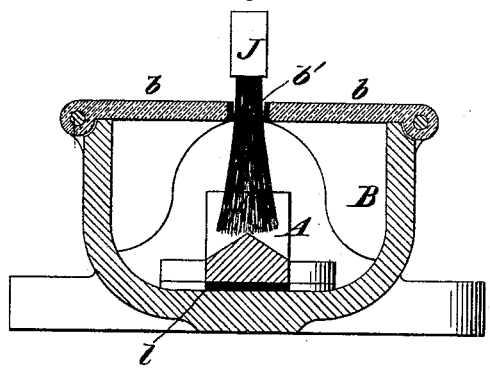

In the accompanying drawings, Figure 1 represents a longitudinal sectional view of a portion of a railway track and car and illustrates the carrying out of my invention; and Fig. 2 is a transverse sectional view of the stationary rack and of a channel in which it is arranged, and of a brush for keeping clean the said rack.

Similar letters of reference designate corresponding parts in both figures.

A designates the stationary rack, which extends the whole length of the track contiguous thereto. This rack is represented as contained in an underground channel, B, such as is described in my hereinabove-mentioned Letters Patent, the said channels being arranged between the track-rails E and having hinged lids $b$, between which a slot, $b'$, is left in the upper part of the said channel for the passage of the toothed wheel C, which is carried by the car and capable of gearing with the toothed rack A, and which derives motion in the rack for the propulsion of the car from the electric motor D on the car.

The electric motor may be of any well-known or suitable kind, and the toothed wheel C may be geared with a pinion, F, on the shaft $d$ of the motor by any suitable train of gearing with suitable insulation.

As represented in the drawings, Fig. 1, the toothed wheel C has its journals $c$ in bearings in a metal frame, G, which is arranged to swing from a fixed axle, $e$, secured to the frame of the car, and the said frame is capable of being lowered and raised to bring the said wheel into gear with and out of gear from the stationary rack A by means of an endless screw, $f$, working in suitable bearings on the car-frame and gearing with a toothed sector, $g$, on said frame G.

On the shaft $e$ are loosely fitted a toothed wheel, $h$, gearing with the said wheel C, and a larger toothed wheel, $i$, gearing with a pinion, F, on the motor-shaft through an intermediate toothed wheel, $j$, which turns on a fixed stud, $k$, secured to the car-frame. The toothed wheels $h$ and $i$ are firmly secured together. The rack A, in order that it may form a part of the electric conductor for conveying from a stationary dynamo at a convenient point through the wheel C to the motor D, should be insulated from the ground or from the channel $b$. It is represented as so insulated by having laid under it a heavy strip of india-rubber, $l$. One of the rails E, through which the current returns from the motor to the dynamo, may also be insulated from the ground and from the other track-rail in any suitable manner.

The connection between the rail A and the motor through the wheel C is made by the axle $e$, the metal frame G and the wire $m$ connecting the said frame with one of the terminals of the motor. The wheel C, forming part of the conducting-circuit, must be insulated in some suitable manner, as, for instance, by applying an insulating medium between the faces of the wheels $h$ and $i$ and between the said wheels and their axle $e$, and also applying an insulating medium at $f^2$, between the bearing $f'$ of the endless screw $f$ and the car-body. The connection between the other terminal $o$ of the motor and the track-rail through which the return-current passes is represented as made by a metallic brush, H, which is attached to the car-body, but insulated therefrom, and which bears upon the said rail E, the connection between the brush and the terminal $o$ being made by a wire, $p$.

In order to insure the insulation of the toothed driving-wheel from the trough or channel B, the lids $b$ of said trough or channel may be made of annealed glass; or, if the said lids be of metal, the edges which form the slot $b'$ may be faced with insulating material.

In order that a clean metallic contact may be preserved between the stationary conducting-rack A and the wheel C, I attach to the front of the car a brush, J, of non-conducting material, or insulated from the car, and which passes through the slot $b'$ in the upper part of the channel B and extends down to the rail for the purpose of sweeping away therefrom any dirt which might intercept the current between it and the wheel C. The dirt thus swept from the rail will be received in the lower part of the channel B on each side of the rail, and may be removed at suitable times in any convenient manner.

By the combination of the stationary toothed rack and toothed driving-wheel gearing with the electro-motor on the car I am enabled to use a very light car, as it is not necessary as it is with a plain driving-wheel and smooth rail to have the car heavy enough to produce adhesion between the driving-wheel and rail.

What I claim as my invention, and desire to secure by Letters Patent, is—

1. The combination, with a railway-track, a car running thereon, and an electric motor on said car, of a stationary toothed rack adjacent to the track, and a toothed wheel carried by the car and gearing in said rack and geared with and driven by said motor, the said rack and toothed wheel forming portions of the conducting-circuit by which an electric current is transmitted to said motor for driving the car, substantially as herein described.

2. The combination, with a railway-track, a car running thereon, and an electric motor on said car, of a slotted channel or trough between the rails of the track, a stationary toothed rack in said channel, a toothed wheel carried by the car, geared with and driven by the said motor, passing through the slot of said channel or trough and gearing with the toothed rack therein, the said rack and toothed wheel forming portions of the conducting-circuit by which an electric current is transmitted to said motor for driving the car, substantially as herein described.

3. The combination of a railway-car, a toothed wheel, and an electric motor for driving the same, both on said car, a stationary toothed rack beneath the car, with which the said toothed wheel gears, and which, with the said toothed wheel, form portions of the electric conductor for conveying electricity to said motor, and a brush attached to said car for sweeping the said toothed rack, substantially as herein described.

ROBT. A. CHESEBROUGH.

Witnesses:
MINERT LINDEMAN,
HENRY J. MCBRIDE.